United States Patent
Nagaya et al.

[11] Patent Number: 5,601,280
[45] Date of Patent: Feb. 11, 1997

[54] LIQUID-SEALED MOUNTING DEVICE

[75] Inventors: Shigeyoshi Nagaya, Kasugai; Masanori Sugiura, Chiryu; Kiyonari Honda, Ichinomiya, all of Japan

[73] Assignee: Nippondenso Co., Ltd, Kariya, Japan

[21] Appl. No.: 375,479

[22] Filed: Jan. 19, 1995

[30]  Foreign Application Priority Data

Jan. 20, 1994  [JP]  Japan ..................... 6-004791

[51] Int. Cl.6 .................................................. F16F 5/00
[52] U.S. Cl. ................................................. 267/140.14
[58] Field of Search ....................... 267/140.14, 140.13, 267/140.15, 219, 159; 188/299, 300, 319; 248/636, 562, 563, 565, 566, 550

[56]  References Cited

U.S. PATENT DOCUMENTS

| | | | |
|---|---|---|---|
| 4,650,170 | 3/1987 | Fukushima | 267/140.14 |
| 4,693,455 | 9/1987 | Andra | 267/140.14 |
| 4,793,599 | 12/1988 | Ishioka | 267/140.14 |
| 4,793,600 | 12/1988 | Kojima | 267/140.14 |
| 4,877,225 | 10/1989 | Noguchi | 267/140.14 |
| 4,899,996 | 2/1990 | Maassen | 267/140.14 |
| 4,901,986 | 2/1990 | Smith | 267/140.14 |
| 5,009,402 | 4/1991 | Sato | 267/140.14 |
| 5,246,213 | 9/1993 | Zup | 267/140.14 |
| 5,269,499 | 12/1993 | Schwab | 267/159 |
| 5,333,455 | 8/1994 | Yoshioka | 267/140.14 |
| 5,439,204 | 8/1995 | Yamazoe | 267/140.14 |

FOREIGN PATENT DOCUMENTS

| | | |
|---|---|---|
| 59-183135 | 10/1984 | Japan . |
| 459495 | 9/1992 | Japan . |
| 439481 | 9/1992 | Japan . |

*Primary Examiner*—Robert J. Oberleitner
*Assistant Examiner*—C. T. Bartz
*Attorney, Agent, or Firm*—Cushman, Darby & Cushman IP Group of Pillsbury Madison & Sutro LLP

[57]  ABSTRACT

A liquid-sealed mounting device that can suitably attenuate and cut off various vibrations of an engine, reduce the number of parts and components necessary, and reduce the energy consumed by the actuator by lowering the operation ratio thereof. The liquid-sealed mounting device includes an upper liquid chamber and a lower liquid chamber, both of which are sealed an have liquid contained therein. The chambers communicate with each other via two orifices provided therebetween. One of the orifices is normally open, while the second orifice may be opened and closed by means of a valve body. An electromagnetic actuator drives the valve body to the open or closed position thereof, and a vibration absorber vibrated and driven by the electromagnetic actuator is provided in the upper liquid chamber. The valve body and the vibration absorber may be used together as a unitary member. A valve stem supports the valve body/vibration absorber and a spring member energizes the valve body/vibration absorber directions toward the opened and closed positions.

12 Claims, 5 Drawing Sheets

LIQUID-SEALED MOUNTING DEVICE

CROSS REFERENCE TO RELATED APPLICATIONS

This application is based upon and claims priority from Japanese Patent Application 6-4791, filed Jan. 20, 1994, the contents of which are incorporated herein by reference and which was published on Aug. 11, 1995 under No. 7-208537.

BACKGROUND OF THE INVENTION

1. Field of the Invention

The present invention relates to a mounting device which is provided with a vibration control function and used to mount an engine, for example, a power unit including an internal combustion engine, a speed change gear, etc., for a motor vehicle, or other machine operated by a motor, to a vehicle body. More particularly, the present invention relates to a liquid-sealed mounting device in which an incompressible liquid is sealed.

2. Related Art

A known liquid-sealing device includes two liquid chambers provided, orifices provided between the two liquid chambers, a partition wall part provided between the two liquid chambers and composed of a flexible or mobile vibration-absorptive member, and an electromagnetic actuator. The electromagnetic actuator vibrates the vibration-absorptive member at the same frequency as the vibrations of an engine and in a phase opposite to the vibrations of the engine so as to have a vibration isolating function (as disclosed in Japanese Examined Utility Model Publication No. 4-39481 and Japanese Examined Patent Publication No. 4-59495).

Such a known mounting device has the following problem. Because vibrations at various frequencies occur in the engine of a motor vehicle, which operates in states ranging from idling to acceleration not to mention normal operation, the vibrations of the engine have to be attenuated and cut off according to the operational condition by always keeping the electromagnetic actuator in operation. As a result, the operation ratio of the electromagnetic actuator is so high that breakdown or shortening of its service life occurs, and the power consumed by the electromagnetic actuator is quite large.

In addition, in order to provide a mounting device which has the ability to vary the frequency of vibration, by closing a part of the orifice with a control valve when the engine is idling, for example, it becomes necessary to provide an actuator for the control valve opening or closing the orifice in addition to the actuator for the vibration-absorptive member. As a result, the number of parts and components increases and the device becomes large in size.

SUMMARY OF THE INVENTION

In light of the above problems, the present invention has as an object the provision of a liquid-sealed mounting device which can suitably attenuate and cut off various vibrational frequencies of an engine, simultaneously reduce the number of parts and components used in the mounting device, and reduce the energy consumed by the actuator by lowering the operation ratio thereof.

To achieve the above object, the liquid-sealed mounting device according to the present invention includes two liquid chambers, orifices for communicating the two liquid chambers with each other and liquid sealed within the two liquid chambers. The orifices are include one that is open all the time and another that may be opened and closed by means of a valve body. Both orifices are provided between the two liquid chambers, an actuator is disposed for driving the valve body to the opened or closed position, and the valve body is to be vibrated and driven by the actuator.

It is advisable that, in the above liquid-sealed mounting device, the valve body works as a vibration absorber, in other words, the valve body and the vibration absorber are integrally formed and that the valve stem supporting the valve body and the vibration absorber should be provided with a spring element energizing the valve body to both the open and closed positions.

It is also advisable that, when the vibration absorber and the valve body are provided separately, the valve body should include a roller. The valve body should contact the side face of the vibration absorber through the roller so that the valve body can open or close the orifice according to the vertical movement of the vibration absorber.

When the above liquid-sealed mounting device is used to support an engine of a device such as a motor vehicle, and when the engine is in an idling state, for example, the valve body is driven by the actuator to the open or closed position and both the orifice, which is always open as well as the orifice that can be opened and closed are open. In this arrangement, when the engine is idling, the liquid contained in the two liquid chambers flows therebetween through both the orifice, which is always open, and the orifice, whose opening may be controlled. When the liquid passes through both orifices, a liquid column resonance is generated due to the vibrations of the engine. As a result, the dynamic spring constant of the mounting device is reduced, and the vibrations of the engine are suitably attenuated and cut off.

If the actuator is so structured as to drive the valve body to the opened or closed position and then the opened or closed state of the valve body is maintained by the action of the spring member, for example, the actuator need only be utilized to drive the valve body. As a result, the energy consumed by the actuator can be reduced.

When the mode of the engine shifts from an idling state to normal operation, the valve body is driven by the actuator to the closed position and the controllable orifice is closed. In this state, the actuator vibrates and drives the valve body or the vibration absorber and also vibrates the liquid within the liquid chambers, so as to control the fluid pressure. At this time, as the vibrations are produced at the same frequency as that of the engine, the vibrations and muffling noise caused by the engine can be effectively attenuated.

Low-frequency vibrations, such as the shock-shake of the engine, caused in the normal running of the engine can be suitably attenuated and cut off by the attenuating force applied when the liquid passes through the normally open orifice.

As the opening and closing of the valve body and the vibrations of the vibration absorber are driven by the same actuator as described above, only one actuator is used in a mounting device, whereby the total number of the parts and components can be reduced.

BRIEF DESCRIPTION OF THE DRAWINGS

The above objects as well as other objects, features, and characteristics of the present invention, as well as the methods of operation of the interrelated elements will become clear to one of ordinary skill in the art based on the following detailed description, the appended claims, and the drawings, all of which form a part of this application. In the drawings:

DETAILED DESCRIPTION OF THE PRESENTLY PREFERRED EXEMPLARY EMBODIMENTS

Referring now to the appended drawings, the preferred embodiments of the present invention will be described.

Figure 1:
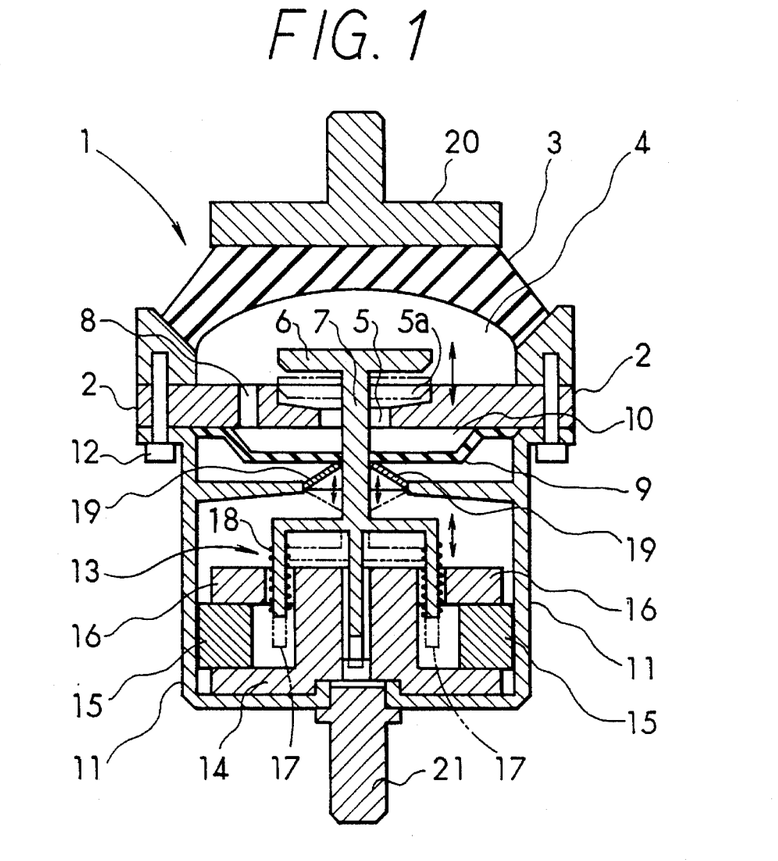
FIG. 1 is a vertical cross-sectional view illustrating the liquid-sealed mounting device according to the first embodiment of the present invention.

FIG. 1 illustrates a vertical cross-sectional view of liquid-sealed mounting device 1. Numeral 2 denotes a disc-shaped partition wall plate. Cupped elastic body 3, preferably formed of rubber, covers, via a ring member, partition wall plate 2. Inside elastic body 3 is formed upper liquid chamber 4. On elastic body 3, supporting part 20 is fixed for supporting an engine.

On the other hand, on the lower side of partition wall plate 2, diaphragm 9 is attached. Between diaphragm 9 and partition wall plate 2 is formed lower liquid chamber 10. In upper liquid chamber 4 and lower liquid chamber 10, an incompressible liquid (e.g., a mixture of water and an ethylene-glycolic family liquid) is sealed.

Orifice 5 is bored in the center of partition wall plate 2. Through orifice 5 passes valve stem 7. In the upper part of orifice 5 is formed a recessed part 5a to the size large enough to accommodate valve body/vibration absorber 6 integrally formed with valve stem 7. Valve body/vibration absorber 6 means a part used as both a valve body and vibration absorber. When the valve is in the closed state, valve body/vibration absorber 6 fills recessed part 5a and closes orifice 5. Through partition wall plate 2 is bored a second orifice 8, which is always left open to allow communication between upper liquid chamber 4 and lower liquid chamber 10.

Upper liquid chamber 4 and lower liquid chamber 10 are isolated by partition wall plate 2 but communicate with each other through orifices 5 and 8 bored through partition wall plate 2. Orifice 5 is opened and closed by valve body/vibration absorber 6. At the lower side of partition wall plate 2 is overlaid cupped case 11 fixed with a plurality of set screws 12 to partition wall plate 2. Within case 11 is disposed electromagnetic actuator 13 for vertically driving valve stem 7, and valve body/vibration absorber 6.

Electromagnetic actuator 13 comprises magnetic material 14, ring magnet 15 disposed on magnetic material 14, another ring magnetic material 16 disposed on magnet 15, a plurality of cores 17 inserted between magnetic material 14 and magnet 15 and between magnetic materials 14 and 16, and coils 18 wound on the plurality of cores 17.

The upper part of the plurality of cores 17 is connected to valve stem 7, and an extended part that extends from the lower end part of valve stem 7 enters the center hole in the center of the magnetic material 14, whereby the vertical motion of stem part 7 is guided along the center hole. Coil 18 of electromagnetic actuator 13 is supplied with AC pulse current, and according to the amperage of this pulse current, core 17 and coil 18 are vertically driven, whereby, valve stem 7 vertically reciprocates, and valve body/vibration absorber 6 opens and closes orifice 5 and vibrates.

Figure 2:
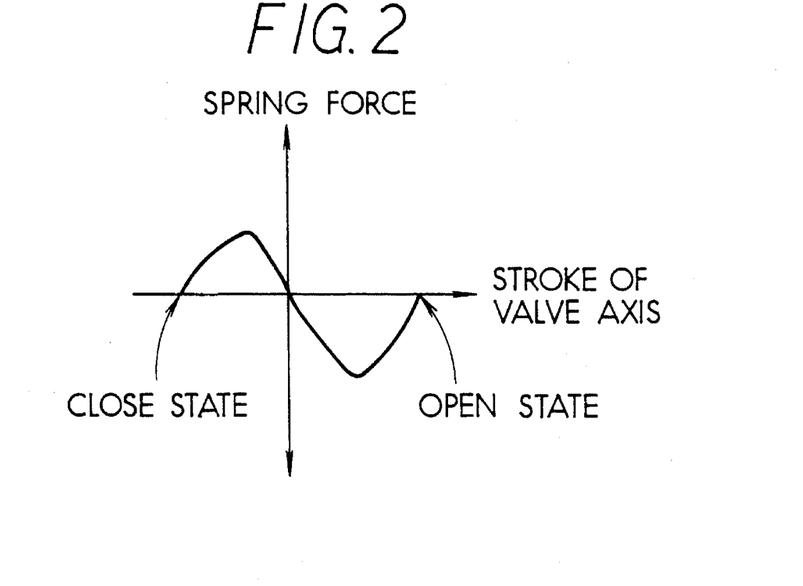
FIG. 2 is a graph illustrating the relation between the spring force of the spring member and the stroke of the valve stem.

To a part of valve stem 7 is attached spring member 19, the other end of which is connected to case 11, for energizing valve body/vibration absorber 6 both towards the open state and the closed state. Spring member 19 is composed of a plate spring, for example, and produces a non-linear spring force against the vertical movements as illustrated in FIG. 2. Accordingly, spring member 9 energizes valve body/vibration absorber 6 in a direction towards the open state thereof driven by the upward driving force of electromagnetic actuator 13 and thereby holds valve body/vibration absorber 6 in the open state, or spring member 9 energizes valve body/vibration absorber 6 in a direction towards the closed position thereof by the downward driving force of electromagnetic actuator 13 and holds valve body/vibration absorber 6 in the closed state. Downwards from the bottom part of case 11 is provided a protrusion of mounting stem 21 for fixing the device according to the present invention to the vehicle side.

Figure 3:
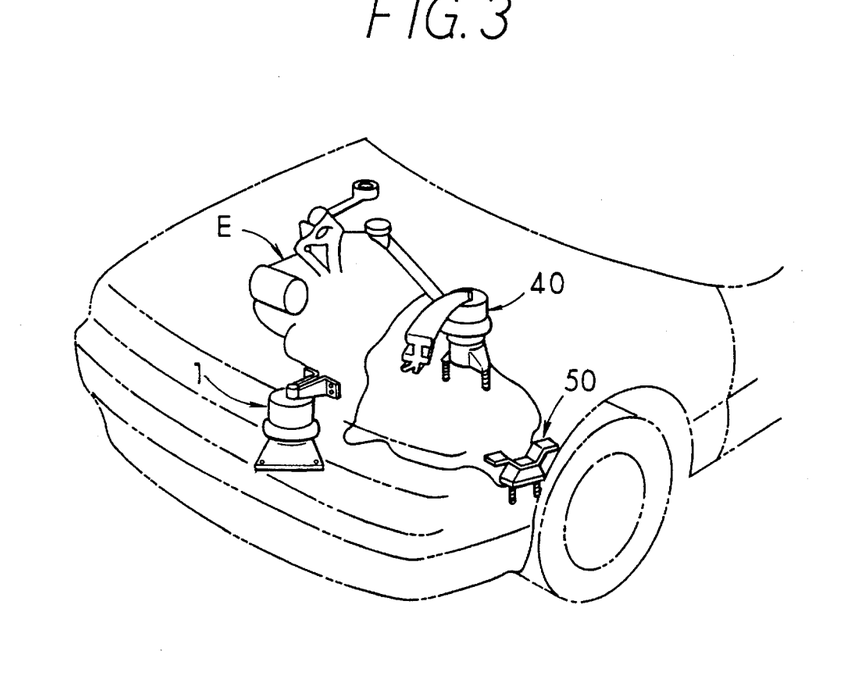
FIG. 3 is a perspective view illustrating the mounted state of the liquid-sealed mounting device to an engine.

As shown in FIG. 3, liquid-sealed mounting device 1 composed as described above is used for supporting transverse engine E of a front-engine and front-drive vehicle. For example, liquid-sealed mounting device 1 is mounted between the vehicle body and engine E to support the front part of engine E. The rear part of engine E is supported by known non-controlled liquid-sealed mount 40, and the left part of engine E is supported by normal vibration isolating rubber type mount 50. Engine E is disposed in transverse position.

For vibrations caused during the operation of engine E in a front-engine and front-drive vehicle, an "antinode" of the vibration mode coincides with the front part of engine E, and the "node" of the same coincides with the rear part of engine E. Therefore, liquid-sealed mounting device 1 according to the present invention is disposed in the position of the "antinode" of the vibration mode.

Electromagnetic actuator 13 of liquid-sealed mounting device 1 is connected to a control circuit (not illustrated). The control circuit is structured so as to open orifice 5 when engine E is in an idling mode, and close orifice 5 and vibrate valve body/vibration absorber 6 when engine E is in a normal running mode as described below.

Next, the operational principle of liquid-sealed mounting device 1 will be described. At first, when engine E is in an idling mode, such as after starting, a driving signal for opening (positive side) is inputted to electromagnetic actuator 13 as in the state illustrated in the leftmost depiction of orifice 5 and valve body/vibration absorber 6 in (1) of FIG. 4. Then, electromagnetic action of coil 18 drives valve stem 7 and valve body/vibration absorber 6 upwards to open orifice 5. At this time, the upward driving by electromagnetic actuator 13 is made against the spring force of spring member 19. However, as spring member 19 acts to hold the state of the valve body in the open or closed position as illustrated in FIG. 2, when the valve body/vibration absorber 6 is in the opened (closed) state, electromagnetic actuator 13 can be electrically energized only for a short time and the subsequent open (closed) state of valve body/vibration absorber 6 is held only by the action of spring member 19. As a result, the power consumption of electromagnetic actuator 13 is small.

When the engine is idling as described above, the vibrations of engine E (at a frequency of around 20 Hz as an example) are applied to upper liquid chamber 4 through supporting part 20 and elastic body 3. By the application of vibrations, the liquid sealed within upper liquid chamber 4 flows to and from lower liquid chamber 10 through orifices 5 and 8. When the liquid passes through orifices 5 and 8, liquid column resonance is caused by the vibrations, whereby the dynamic spring constant of mounting device 1 is reduced, and the vibrations of engine E is suitably attenuated and then cut off.

Figure 4:
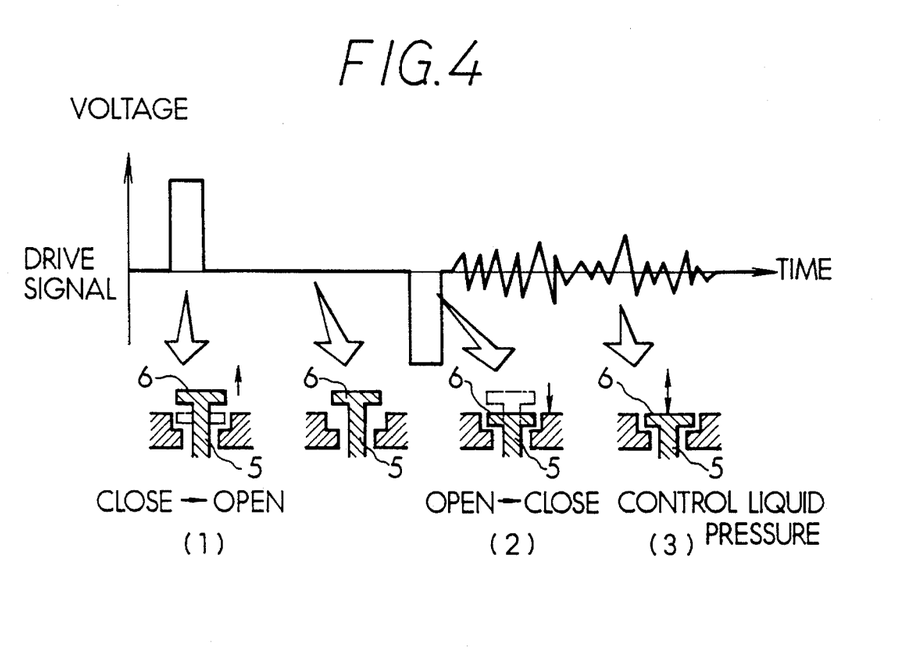
FIG. 4 is an explanatory chart illustrating the mode of operation of the liquid-sealed mounting device.

When the mode of engine E shifts from idling to normal running, a driving signal for closing (negative side) is input in the electromagnetic actuator 13 as the state illustrated in (2) of FIG. 4. Electromagnetic action of coil 18 drives valve stem 7 and valve body/vibration absorber 6 downwards, whereby orifice 5 is closed. At this time, the downward driving by electromagnetic actuator 13 is made again against the spring force of spring member 19. In the same way as described above, however, as spring member 19 acts to hold the state of valve body/vibration absorber 6 in the closed position. When electromagnetic actuator 13 is in the closed state, electromagnetic actuator 13 can be electrically energized only for a short time and the subsequent close state of valve body/vibration absorber 6 is held only by the action of spring member 19.

On the other hand, after valve body/vibration absorber 6 is turned to be in the closed state, a driving signal for liquid control (for vibrations) is inputted in electromagnetic actuator 13 as the state illustrated in (3) of FIG. 4. As a result, electromagnetic actuator 13 vertically vibrates valve body/vibration absorber 6, and the pressure of the liquid contained in upper liquid chamber 4 is controlled by the vertical vibrations of valve body/vibration absorber 6. The vibrations at this time have the same frequency as those of the engine (50 Hz to 200 Hz as an example), and therefore the vibrations and muffling noise caused by the engine E can be attenuated effectively.

Vibrations of the engine at low frequencies (around 10 Hz), such as a shock-shake, caused during the normal running can be attenuated and cut off by the attenuating force generated when the liquid within upper liquid chamber 4 and low liquid chamber 10 passes through orifice 8, which is open at all times. In addition, as liquid-sealed mounting device 1 supports engine E at the front part thereof with which an antinode of the vibrations coincides, vibrations with large amplitudes can effectively be attenuated. A conventional mounting device which supports the inertia created by the main shaft suspends a transverse engine of a front-engine and front-drive vehicle at four points of front, rear, right side and left thereof. However, liquid-sealed mounting device 1 according to the present invention, supports only the front part of engine E, which is the part that coincides with the antinode of the vibration mode, which largely contributes to the transmission of vibrations. Therefore, engine E can stably be supported while providing suitable vibration attenuation or cut-off performance at only three points being liquid-sealed mount 1, non-controlled liquid-sealed mount 40 supporting engine E at the rear part at which the node of the vibration mode is coincident, and vibration isolating rubber type mount 50 supporting engine E at the left side thereof. As a result, the number of necessary mounts can be reduced from that of the conventional mounting device.

Figure 5:
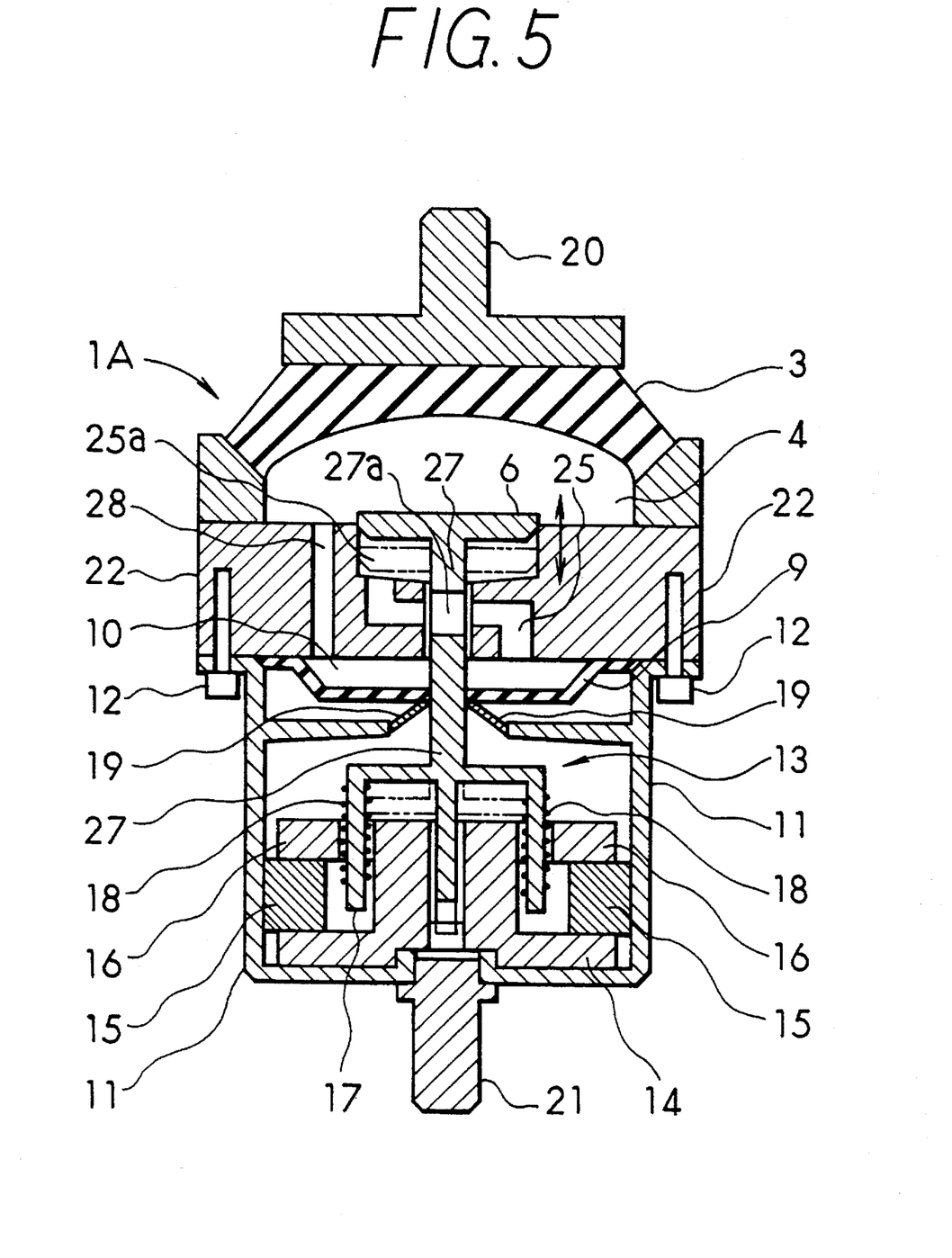
FIG. 5 is a vertical cross-sectional view illustrating the liquid-sealed mounting device according to the second embodiment of the present invention.

FIG. 5 illustrates another embodiment of the liquid-sealed mounting device 1A. Liquid-sealed mounting device 1A includes a valve device provided in a part of orifice 25 which is opened and closed by valve stem 27. The same numerals as those in the first embodiment will be allocated to the counterparts respectively, and description thereof will be omitted.

In liquid-sealed mounting device 1A, valve body/vibration absorber 6 is provided at the tip end of valve stem 27. Orifices 28, which is normally open, and orifice 25, which is controllable, are bored in partition wall plate 22. Orifice 25 opens at the upper end thereof to recessed part 25a formed at the side of upper liquid chamber 4, opens at the lower end thereof to lower liquid chamber 10, and communicates at the intermediate part thereof with the center hole in partition wall plate 22 throughout which valve stem 27 is disposed.

Part of valve stem 27 is provided in passage 27a, which communicates with orifice 25. In this arrangement, when valve stem 27 goes up to the open position, orifice 25 communicates with passage 27a as illustrated in FIG. 5, and when valve stem 27 goes down to the closed position, orifice 25 is closed by valve stem 27.

Liquid-sealed mounting device 1A composed as described above operates in the same way as the first embodiment of liquid-sealed mounting device 1. However, in liquid-sealed mounting device 1A, when valve stem 27 is driven downwards by electromagnetic actuator 13 and then valve body/vibration absorber 6 fill recessed part 25a of orifice 25, orifice 25 is closed by valve stem 27.

That is, in the first embodiment of liquid-sealed mounting device 1 (FIG. 1), orifice 5 is bored to be along and around valve stem 7, and even when valve body/vibration absorber 6 is in the closed state, the pressure of the lower liquid chamber 10 is applied to the lower side of the valve body/vibration absorber 6. Therefore, in liquid-sealed mounting device 1, the spring constant of spring member 19 should be high to a certain extent so as to hold the closed state of the valve body/vibration absorber 6. However, in the second embodiment of liquid-sealed mounting device 1A, FIG. 5, as the pressure of lower liquid chamber 10 applied to the lower side of the valve body/vibration absorber 6, when valve body/vibration absorber 6 is in the closed state, i.e., when orifice 25 is in the closed state, can be isolated by closing orifice 25 by means of valve stem 27. Therefore, the spring constant of spring member 19 can be made smaller than that of the first embodiment illustrated in FIG. 1. As a result, the driving force of electromagnetic actuator 13 can be reduced, whereby electromagnetic actuator 13 can be downsized.

Figure 6:
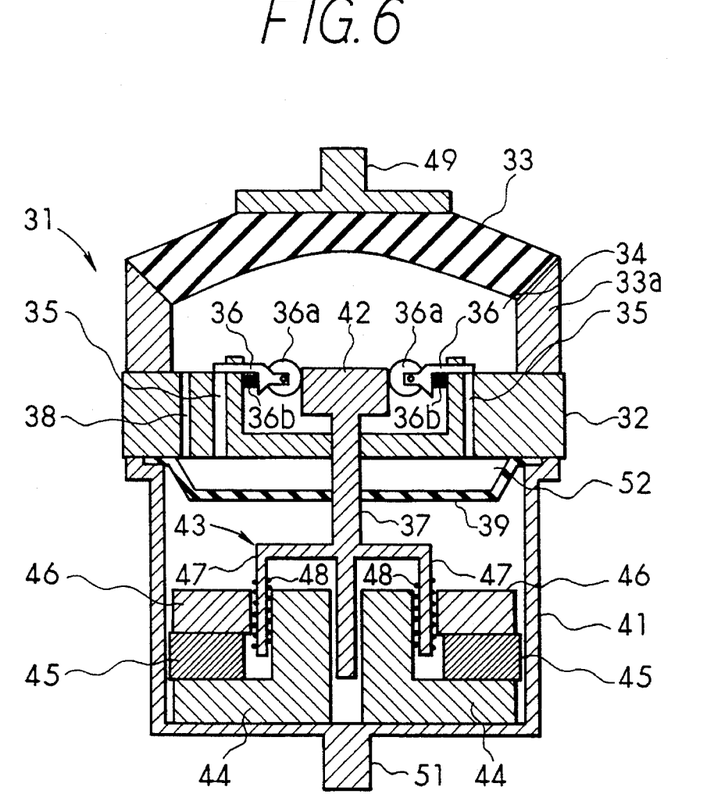
FIG. 6 is a vertical cross-sectional view illustrating the liquid-sealed mounting device according to the third embodiment of the present invention.
Figure 7:
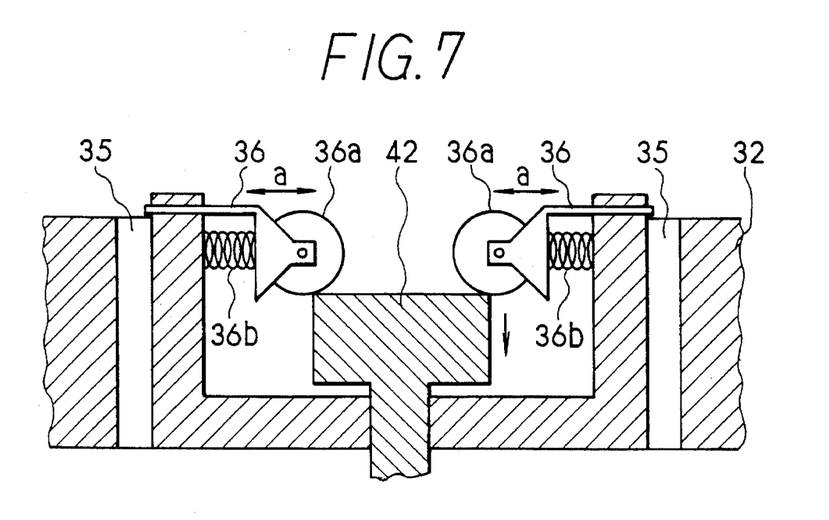
FIG. 7 is a partial enlarged cross-sectional view illustrating the liquid-sealed mounting device of the third embodiment in the valve-open state.
Figure 8:
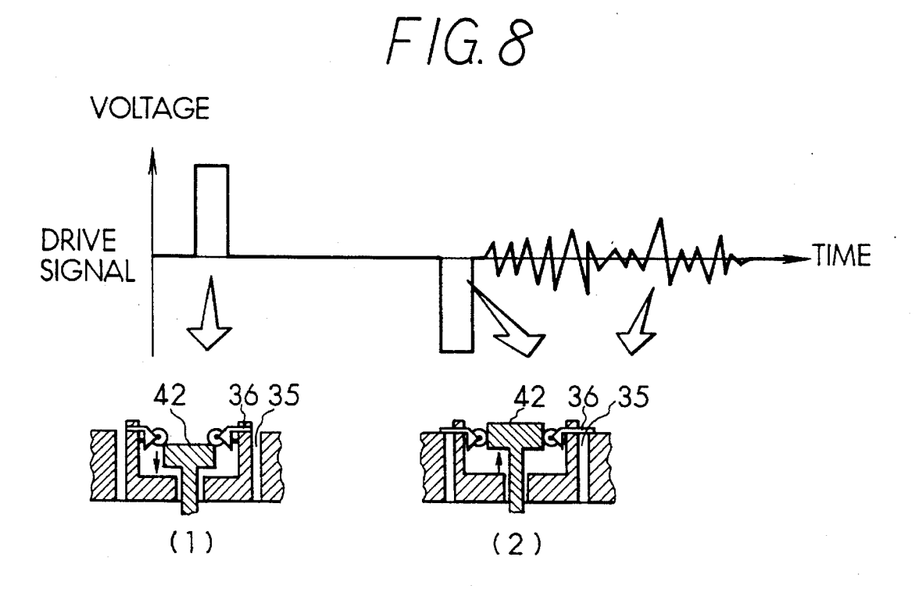
FIG. 8 is an explanatory chart illustrating the mode of operation of the liquid-sealed mounting device of the third embodiment.

FIGS. 6 through 8 illustrate still another embodiment of liquid-sealed mounting device 31. Numeral 32 denotes a disc-shaped partition wall plate. Cupped elastic rubber body 33 in connection with ring member 33a covers and is fixed to, thus forming upper liquid chamber 34. On elastic body 33 is fixed supporting part 49 for supporting the engine.

To the lower side of partition wall plate 32 is attached diaphragm 39. Between diaphragm 39 and partition wall plate 32 is formed lower liquid chamber 52. In upper liquid chamber 34 and lower liquid chamber 52 is sealed incompressible liquid, such as a mixture of water with a ethyleneglycolic liquid.

Through the center of partition wall plate 32, valve stem 37 passes. At the tip end of valve stem 37 is provided vibration absorber 42. On the upper face of partition wall part 32 is formed a recessed part to be filled with vibration absorber 42. Orifices 35 are bored connecting upper liquid chamber 34 and lower liquid chamber 52 to each other. In addition, on partition wall plate 32, valve bodys 36 and 36 with rollers for closing the orifices 35 and 35 are provided.

Both valve bodys 36 and 36 are so provided as to move on partition wall plate 32 in the horizontal direction of these figures to open and close orifices 35 and 35, respectively, as indicated by two-directional arrows a in FIG. 7. Coil springs 36b and 36b are so provided as to energize valve bodys 36 and 36 in the direction towards the open position thereof. Rollers 36a and 36a are rotatably supported at the inside of the valve bodys 36 and 36. Rollers 36a and 36a are in contact with the side faces of vibration absorber 42 within the recessed part, rotate according to the vertical movement of vibration absorber 42, and move in the horizontal direction as indicated by arrows a to drive valve bodys 36 and 36 to the valve open and closed positions.

In addition, at the left side of partition wall plate 32, orifice 38 is bored, which remains open at all times. Orifice connects upper liquid chamber 34 and lower liquid chamber 52 to each other. To the lower side of partition wall plate 32, a cupped case 41 is securely fixed. Within case 41 is disposed electromagnetic actuator 43 for vertically driving valve stem 37 and vibration absorber 42.

Electromagnetic actuator 43 includes magnetic material 44, ring magnet 45 disposed on magnetic material 44, ring magnetic material 46 disposed on magnet 45, a plurality of cores 47 inserted between magnetic material 44 and magnet 45 and between magnetic materials 44 and 46, and coils 48 wound around the plurality of cores 47.

The upper part of the plurality of cores 47 is connected to valve stem 37. At the lower end of valve stem 37 is provided an extended portion which extends into the center hole in the center of magnetic material 44, whereby the vertical movement of valve stem 37 is guided. Coil 48 of electromagnetic actuator 43 is supplied with AC pulse current. According to the supplied pulse current, core 47 and coil 48 are vertically driven, and accordingly valve stem 37 moves up and down, whereby vibration absorber 42 activates the valve bodys 36 and 36 to open or close orifices 35 and 35, while at the same time making a vibrating motion. From the bottom part of case 41 extends mounting stem 51 for fixing mounting device 31 to a vehicle body.

Liquid-sealed mounting device 31 composed as described above is mounted between the vehicle body and the engine so as to support the front part of the engine of a front-engine and front-drive vehicle as the first embodiment is mounted as illustrated in FIG. 3. The rear part of the engine is supported by a known non-controlled liquid-sealed mount, and the left part of the engine is supported by a normal vibration isolating rubber type mount.

Electromagnetic actuator 43 is connected to a control circuit (not illustrated). This control circuit is formed so that orifice 35 opens when the engine is idling and closes and vibrates valve body/vibration absorber 42 when the engine is in a normal running mode as described below.

Next, the operational principle of liquid-sealed mounting device 31 will be described. At first, when the engine is idling, for example, after starting, a driving signal for opening (positive side) is input to electromagnetic actuator 43, and the electromagnetic action of coil 48 drives valve stem 37 and vibration absorber 42 downwards as is the situation in FIG. 7 and (1) of FIG. 8.

As a result, valve bodys 36 and 36 at both sides move inwards in the direction of arrow a due to the spring force of coil springs 36b and 36b, respectively, whereby orifices 35 and 35 are opened. The downward load on electromagnetic actuator 43 at this time is as small as that required only for lowering vibration absorber 42. In addition, electromagnetic actuator 43 is electrically energized only for a short time, and subsequently valve bodys 36 and 36 can be held in the open state by the action of coil springs 36b and 36b, respectively. Therefore, the power consumption of electromagnetic actuator 43 is very small.

When the engine is idling as described above, the vibrations of the engine (at a frequency around 20 Hz as an example) are applied to upper liquid chamber 34 through supporting part 34 and elastic rubber body 33. At this time, the liquid within upper liquid chamber 34 flows to and from lower liquid chamber 52 through orifices 35 and 38. When the liquid passes through orifices 35 and 38, liquid column resonance is caused by the vibrations, whereby, the dynamic spring constant of mounting device 31 is reduced, and the vibrations of the engine are suitably attenuated or cut off.

When the mode of the engine shifts from idling to normal running, a driving signal for closing is inputted to the electromagnetic actuator 43 as illustrated in (2) of FIG. 8. The electromagnetic action of coil 48 drives valve stem 37 and vibration absorber 42 upwards. As a result, valve bodys 36 and 36 are pushed by vibration absorber 42 via rollers 36a and 36a, respectively, move outwards against the spring force of coil spring 36b and 36b, and thus close orifices 35 and 35. In this state, as the rollers 36a and 36a are in contact with the side faces of the vibration absorber 42 and the valve bodys 36 and 36 are held in the closed state, the electromagnetic actuator 43 is electrically energized only for a short time.

After valve bodys 36 and 36 are turned to be in the closed state, a driving signal for liquid pressure control (for vibrations) is input in electromagnetic actuator 43, whereby electromagnetic actuator 43 vertically vibrates vibration absorber 42 and the pressure of the liquid within upper liquid chamber 34 is controlled. At this time, the vibrations are at the same frequency as those of the engine (50 Hz to 200 Hz as an example), and the vibrations and muffling noise caused by the engine can effectively be attenuated.

The vibrations of the engine at a low frequency (approximately 10 Hz), such as a shock-shake, caused during the normal running are suitably attenuated or cut off by the attenuating force generated when the liquid within upper liquid chamber 34 and low liquid chamber 52 passes through orifice 38.

This invention has been described in connection with what are presently considered to be the most practical and preferred embodiments of the present invention. However, this invention is not to be limited to the disclosed embodiments, but rather is intended to cover various modifications and alternative arrangements included within the spirit and scope of the appended claims.

What is claimed is:

1. A liquid-sealed mounting device comprising:
   two liquid chambers having a liquid sealed therein,
   a first orifice for allowing communication between said two liquid chambers and that allows liquid to pass therethrough; said first orifice normally remaining open;

a second orifice for allowing communication between said two liquid chambers and that allows liquid to pass therethrough;

a vibratable valve body for opening and closing said second orifice; and an actuator for driving said valve body between an open and closed position and vibrating said valve body when the valve body is closing said second orifice;

wherein said valve body includes a valve stem having a passage which is able to connect with said second passage so that said valve stem opens or closes said second passage.

2. A liquid-sealed mounting device comprising:

two liquid chambers having a liquid sealed therein, a first orifice for allowing communication between said two liquid chambers and that allows liquid to pass therethrough; said first orifice normally remaining open;

a second orifice for allowing communication between said two liquid chambers and that allows liquid to pass therethrough;

a vibratable valve body for opening and closing said second orifice;

an actuator for driving said valve body between an open and closed position and vibrating said valve body; and a spring for urging said valve body in either a valve opening direction or a valve closing direction, said actuator operating only while said valve body is being actuated between said open and closed positions.

3. The liquid-sealed mounting device according to claim 2, wherein said valve body includes a valve stem integrally formed therewith and extending therefrom.

4. The liquid-sealed mounting device according to claim 2, wherein said liquid-sealed mounting device is disposed so as to support a front part of a transverse engine of a front-engine and front-drive vehicle.

5. A liquid-sealed mounting device for absorbing a vibration from a vehicle engine, comprising:

first and second chambers with liquid sealed therein;

first and second communication means for allowing communication between said first and said second chamber and allowing liquid to flow from one of said chambers to another, said first communication means normally remains open;

a sealing member for closing said second communication means;

a vibration absorber for moving up and down in at least one of said chambers;

an actuator for driving said sealing member and vibrating said vibration absorber vertically in response to said vibration; and a spring member that energizes said sealing member in both directions to keep said sealing member in an open or closed position relative to said second communication means, said actuator operating only while said sealing member and vibration absorber are being actuated between said open and closed positions.

6. A liquid-sealed mounting device according to claim 5, wherein said sealing member and said vibration absorber are integrally formed.

7. A liquid-sealed mounting device according to claim 5, wherein said sealing member includes a roller and contacts with a side face of said vibration absorber through said roller, and said sealing member opens or closes said second communicating means according to the vertical movement of said vibration absorber.

8. A liquid-sealed mounting device according to claim 5, wherein said first and second communication means are first and second passages extending between said first and second chambers.

9. A liquid-sealed mounting device according to claim 5, wherein said valve body includes a valve stem formed integrally therewith and extending therefrom and a core attached at a lower end thereof.

10. A liquid-sealed mounting device according to claim 9, wherein said first and second communication means are first and second passages extending between said first and second chambers, and said valve stem reciprocates through said second passage.

11. A liquid-sealed mounting device according to claim 9, wherein said first and second communication means are first and second passages extending between said first and second chambers, and said valve stem has a passage which is able to connect with said second passage so that said valve stem opens or closes said second passage.

12. A liquid-sealed mounting device for absorbing a vibration from a vehicle engine, comprising:

first and second chambers with liquid sealed therein;

first and second communication means for allowing communication between said first and said second chambers and allowing liquid to flow from one of said chambers to another, said first communication means normally remaining open;

a sealing member for closing said second communication means;

a vibration absorber for moving up and down in at least one of said chambers; and an actuator for driving said sealing member and vibrating said vibration absorber vertically in response to said vibration absorber vertically in response to said vibration, wherein said sealing member includes a roller and contacts with a side face of said vibration absorber through said roller, and said sealing means member opens or closes said second communicating means according to the vertical movement of said vibration absorber.

* * * * *